United States Patent [19]

Taniguchi et al.

[11] Patent Number: 4,789,592
[45] Date of Patent: Dec. 6, 1988

[54] HOT-MELT-ADHESIVE COMPOSITE FIBER

[75] Inventors: Masahiko Taniguchi; Shigeru Goi, both of Moriyama, Japan

[73] Assignee: Chisso Corporation, Japan

[21] Appl. No.: 908,159

[22] Filed: Sep. 17, 1986

[30] Foreign Application Priority Data

Sep. 19, 1985 [JP] Japan ................... 60-207249

[51] Int. Cl.$^4$ .............................................. D02G 3/00
[52] U.S. Cl. ................... 428/373; 428/374; 428/375; 428/394; 428/395
[58] Field of Search ............... 428/373, 374, 375, 395, 428/394

[56] References Cited

U.S. PATENT DOCUMENTS

| | | | |
|---|---|---|---|
| 3,511,747 | 5/1970 | Davies ................... | 428/288 |
| 3,595,731 | 7/1971 | Davies et al. ............ | 428/151 |
| 4,211,819 | 7/1980 | Kumimune et al. ...... | 428/364 |
| 4,269,888 | 5/1981 | Ejima et al. ............ | 428/296 |
| 4,323,626 | 4/1982 | Kunimune et al. ...... | 428/374 |
| 4,477,516 | 10/1984 | Sugihara et al. ......... | 428/296 |
| 4,500,384 | 2/1985 | Tomioka et al. ......... | 428/373 |
| 4,551,378 | 11/1985 | Carey, Jr. ............... | 428/296 |
| 4,552,603 | 11/1985 | Harris, Jr. et al. ....... | 428/296 |

FOREIGN PATENT DOCUMENTS

| | | | |
|---|---|---|---|
| 55-17807 | 5/1980 | Japan . | |
| 1349645 | 4/1974 | United Kingdom ........ | 428/373 |
| 2121423 | 12/1983 | United Kingdom ........ | 428/373 |

Primary Examiner—Sharon A. Gibson
Attorney, Agent, or Firm—Leydig, Voit & Mayer

[57] ABSTRACT

A hot-melt-adhesive composite fiber having a broad temperature range of hot-melt adhesion, exhibiting a low heat-shrinkage over the whole temperature range thereof, having a high tenacity and suitable to production of a non-woven fabric having superior restoring properties, bulkiness, draping properties and feeling is provided, which composite fiber comprising a fiber-forming component and an adhesive component, the fiber-forming component comprising 0.5 to 30% by weight of a copolymer of a carboxyl group containing modified polyolefin with a polyamide, and the adhesive component comprising a carboxyl group-containing modified polyolefin, an unmodified polyolefin or a mixture thereof.

13 Claims, No Drawings

HOT-MELT-ADHESIVE COMPOSITE FIBER

BACKGROUND OF THE INVENTION

1. Field of the Invention

This invention relates to a hot-melt-adhesive composite fiber capable of being adhered by heating. More particularly it relates to a hot-melt-adhesive composite fiber which has a broad temperature range of hot-melt adhesion; exhibits a low heat-shrinkage over the whole temperature range thereof; has a high tenacity; and is suitable to production of a non-woven fabric having superior restoring properties, bulkiness, draping properties and feeling.

2. Description of the Related Art

A process for producing a non-woven fabric by utilizing the heat melt adhesion of a lower melting point component of a composite fiber consisting of a plurality of polymers having different melting points has been well known and the process is suitable mainly to production of a non-woven fabric having a medium or low basic weight. Japanese patent publication No. 55-17807/1980 discloses a polyolefin composite fiber consisting of a fiber-forming component of polypropylene and an adhesive component of polyethylene. However, since such a fiber has a relatively small difference in the melting points of both the components, the temperature range in which heat-melt adhesion can be carried out at a state of low percentage heat shrinkage is so narrow that correct temperature control is required in the production of non-woven fabrics. Japanese patent application laid-open No. 57-176217/1982 discloses a composite fiber consisting of a fiber-forming component of a polyester and an adhesive component of polyethylene or polypropylene. Since this fiber has a large difference in the melting points of both components, there is an advantage that the heat-melt adhesion temperature range is far broader than that of the above polyolefin composite fiber, but on the other hand, since the compatibility of the polyester with the polyolefin is inferior, there is a drawback that both the components are liable to separate from each other. Further, according to Japanese patent application laid-open No. 57-176217/1982, composite fibers are subjected to heat treatment in advance, in order to prevent shrinkage at the time of hot-melt adhesion, thus both the components of the resulting composite fibers are more liable to peel off from each other so that there are drawbacks that non-woven fabrics using such composite fibers have a weak nerve; are inferior in the restoring properties after repeated load applications; and are so weak in abraision resistance that the peeled polyethylene component is separated and forms a powder.

SUMMARY OF THE INVENTION

In order to overcome the above-mentioned drawbacks of hot-melt-adhesive composite fibers, the present inventors have made extensive research, and as a result have found that when a mixture essentially consisting of 0.5 to 30% by weight of a copolymer of a carboxyl group-containing modified polyolefin with a polyamide and 70 to 99.5% by weight of a polyester is used as a fiber-forming component of the composite fibers and a carboxyl group-containing modified polyolefin (hereinafter often abbreviated merely to modified polyolefin), an unmodified polyolefin or a mixture of the two is used as an adhesive component thereof, the above object can be achieved.

DETAILED DESCRIPTION OF PREFERRED EMBODIMENTS

Examples of the polyester used in the present invention are polyesters usually used as raw fiber materials such as polyethylene terephthalate, polybutylene terephthalate, polymethylene terephthalate, polyp-ethyleneoxybenzonate, etc. Examples of the polyolefin are polymers or copolymers composed mainly of α-olefins such as ethylene, propylene, butene-1, etc. and specifically, polyethylene, polypropylene, ethylene-vinyl acetate copolymer, etc.

The carboxyl group-containing modified polyolefin refers to those polymers obtained by modifying polyolefins with unsaturated carboxylic acids such as acrylic acid, methacrylic acid, maleic acid, fumaric acid, maleic anhydride, itaconic anhydride, etc. As the modification process, a process of adding 0.05 to 2% by weight of an unsaturated carboxylic acid and a slight quantity of an organic peroxide to a polyolefin, followed by melt-kneading the mixture by means of an extruder is preferably employed, because it is simple.

The copolymer of the modified polyolefin with a polyamide (hereinafter often abbreviated merely to copolymer) can be easily obtained by melt-kneading the above-mentioned modified polyolefin and a polyamide such as nylon 6, nylon 12, nylon 66, etc. to thereby condense the carboxyl group of the modified polyolefin with the terminal amino group of the polyamide during the kneading process. The quantity of the modified polyolefin component in the copolymer is 0.5 to 60% by weight, preferably 2 to 50% by weight. If the quantity of the modified polyolefin in the copolymer is less than the lower limit of the above-mentioned range, there are drawbacks that the compatibility of the copolymer with the polyester is insufficient, and hence the compatibility of the hot-melt-adhesive component with the fiber-forming component is insufficient, whereby the spinnability is reduced and the resulting fiber is liable to peel off. Further, if the quantity of the modified polyolefin exceeds the above range, thermal degradation occurs at the time of kneading in the production of the copolymer or at the time of spinning to colorize the fiber, In the present invention, a mixture of 70 to 99.5% by weight of the above polyester with 30 to 0.5% by weight of the above copolymer is used as a fiber-forming component. If the quantity of the copolymer in the fiber-forming component exceeds 30% by weight, the spinnability of the hot-melt-adhesive composite fiber is inferior. If the quantity is less than 0.5% by weight, it is impossible to prevent peeling off of the layers of the fiber-forming component and the adhesive component therebetween.

In the present invention, a modified polyolefin, an unmodified polyolefin or a mixture of these two in an optional proportion is used as the adhesive component. If the proportion of the unmodified polyolefin in the adhesive component is increased, physical properties such as solvent resistance, etc. are improved, while if the proportion of the modified polyolefin therein is increased, the melt-adhesion strength between fibers increases so that it is possible to obtain a high tenacity non-woven fabric.

The modified polyolefin used as the component of the above copolymer may be of the same kind as or a different kind from that of the modified polyolefin used as the adhesive component, and these modified polyolefins may be those obtained by modifying the polyolefin of the same kind as that of the polyolefin used as the adhesive component or those obtained by modifying the polyolefin of a different kind from that of the polyolefin used thereas.

The hot-melt-adhesive composite fiber of the present invention is obtained by composite-spinning the above fiber-forming component and adhesive component by means of a conventional known composite-spinning die, so as to give a side by side arrangement or a sheath and core arrangement where the adhesive component forms its sheath component, followed, if desired, by stretching, crimping, cutting or the like, and is used in the form of a filament or a staple fiber.

The thus obtained hot-melt-adhesive composite fiber of the present invention is difficult to separate the fiber-forming component from the adhesive component, and has a broad hot-melt adhesion temperature range. Further, this composite fiber has a characteristic of exhibiting a low percentage heat shrinkage over the whole hot-melt-adhesion temperature range, and also a specific feature that even when composite-spinning is carried out so as to give a side by side arrangement of the components, where crimp or shrinkage is generally liable to occur by heat treatment, only a low percentage shrinkage similar to that in the case of a sheath and core arrangement of the components is exhibited.

The hot-melt-adhesive composite fibers of the present invention can be made into a non-woven fabric according to hot-melt adhesion process, solely or in admixture with other fibers.

The above non-woven fabric using the hot-melt-adhesive composite fiber of the present invention has various characteristics such as being free from peeling off between the composite components so that it has a great tenacity, a strong nerve, superior restoring properties and a great abraision-resistance, and since no shrinkage occurs at the time of heat treatment for converting the composite fibers into the non-woven fabric, there is neither warpage nor waviness, and also it has a good feeling.

The present invention will be described in more detail by way of Examples and Comparative examples. The evaluation methods of physical properties carried out in these examples are as follows:

(i) Percentage area shrinkage

Sample fibers having a mechanical crimping of 10 crimps/25 mm imparted onto composite fibers and cut to a fiber length of 64 mm are passed through a carding machine to obtain a web having a basic weight of 100 g/m$^2$, from which a sample piece of 25 cm (longitudinal)×25 cm (lateral) is cut off. This sample piece is heat-treated at a definite temperature of 140° to 200° C. for 5 minutes to obtain a non-woven fabric (about 7 mm thick). The percentage area shrinkage is given according to the following equation through the area of the non-woven fabric (S, cm$^2$) after the heat treatment:

Percentage area shrinkage (%)=(1−S/625)×100

(ii) Appearance

With the above non-woven fabric, judgement of its feeling and observation of the presence or absence of peeling-off by means of a microscope were carried out by 5 panelists. The fabric judged by all persons to be good was designated as "A"; the case where three or four persons judged the fabric to be good was designated as "B"; and the case where more than 3 persons judged the fabric to be inferior was designated as "C".

(iii) Restoring properties:

An impactor of 5 cm in diameter and 1 Kg in weight, having a bottom surface covered by a flat rubber of a hardness according to JIS K6301 A method of 60 H$_s$ was dropped onto the above non-woven fabric having its thickness (a mm) measured in advance, from a location of 20 mm height, 1,000 times at a rate of 195 times per minute, followed by allowing the fabric to stand for 5 minutes to measure its thickness (b mm). Those having a percentage reduction of thickness of less than 5% were judged to be good; those having that of less than 10% were judged to be fairly good; and those having that of 10% or more were judged to be inferior, and these were designated as "A", "B" and "C", respectively.

Percentage reduction of thickness (%) =(1−b/a)×100

(iv) Tenacity

A test piece of 5 cm width and 15 cm length was cut off from the non-woven fabric and its break strength (Kg/5 cm) was measured at a gripped distance of 10 cm and at a stretching rate of 10 cm/min, according to JIS L1096.

(v) Abrasion Resistance

Test pieces subjected to the test of restoring properties were observed by means of a microscope, and those of many occurrences of peeling-off of the composite components were judged to be inferior; those of a few occurrences thereof were judged to be fairly good; and those of no occurrence thereof were judged to be good, and these were designated as "C", "B" and "A", respectively.

The values of physical properties, compositions, etc. of various kinds of polyesters, polyolefins, modified polyolefns and copolymers of modified polyolefins with polyamides are collectively shown in tables 1~4.

EXAMPLE 1

Melt spinning was carried out in a composite ratio of 50/50 at a spinning temperature of 280° C., using as a fiber-forming component (core component), a polyethylene terephthalate (PET-1) of an intrinsic viscosity (IV) of 0.7 and a melting point of 256° C., having added 1% by weight of a copolymer (PAO-1) of 30% by weight of a maleic anhydride-modified polyethylene (MPO-2) containing 0.1% by weight of carboxyl group, 20% by weight of an unmodified high density polyethylene (PO-2) and 50% by weight of nylon 6, and as an adhesive component (sheath component), a high density polyethylene (PO-2) of a melt flow rate (190° C.) of 25 and a melting point of 132° C. having added 10% by weight of the above modified polyethylene (MPO-2), and employing a composite spinning die of sheath and core type (hole diameter 0.6 mm; number of holes 350), to obtain unstretched fibers of 10 denier/filament. These unstretched fibers were stretched to 3.5 times the original length at 80° C., followed by imparting 10 crimps/25 mm to the fibers in a stuffer box and thereafter cutting the crimped fibers to a length of 64 mm to obtain staple fibers of 3 d/f×64 mm. In this Example, the spinnability and the stretchability were both good.

The above staple fibers were passed through a carding machine to obtain a web having a basic weight of 100 g/m², followed by heat-treating this web by means of a suction dryer under two conditions of 140° C. for 5 minutes and 200° C. for 5 minutes to obtain non-woven webs. The percentages area shrinkage of the webs by the heat treatments were 0% in either case, and the resulting non-woven fabrics had a good appearance, a tenacity of 20 Kg/5 cm and recovering properties of less than 5%, that is, all of these values were good. These data are shown in Table 5.

EXAMPLES 2~8

As a fiber-forming component and an adhesive component, various stocks shown in Tables 1~4 were combined and used, and the processes of composite spinning and heat treatment were repeated according to the process of Example 1 to obtain non-woven fabrics except that the denier of the stretched fiber was 2 d/f in Example 5 and 6 d/f in Example 7, and composite spinning of side by side type was carried out in Example 8. The spinnability and the physical properties of non-woven fabrics in these Examples are shown in Table 5.

COMPARATIVE EXAMPLES 1~5

As examples of hot-melt-adhesive composite fibers of conventional type, the spinnability and physical properties of non-woven fabric of those of propylene/polyethylene (Comparative examples 1 and 2) and those of polyester/polyethylene (Comparative example 5) were tested. Further, with the case where the content of the copolymer in the fiber-forming component is outside the claimed range of the present invention, tests were similarly carried out (Comparative examples 3 and 4). In Comparative example 2, Example 1 was repeated except that composite spinning of side by side type was carried out. The results are shown together in Table 5. In the cases of Comparative examples 1 and 2, large percentages area shrinkage were exhibited already at 160° C.; in the cases of Comparative examples 4 and 5 wherein the content of the copolymer in the fiber-forming component is low, the composite components are liable to peel off and the appearance and the restoring properties of the non-woven fabric are inferior; and in the case of Comparative example 3 wherein the content of the copolymer in the fiber-forming component is high, the spinnability is inferior and stretched fibers capable of being processed into non-woven fabric could not be obtained.

TABLE 1

| symbol | Polyester | M.P. (°C.) | IV |
| --- | --- | --- | --- |
| PET-1 | Polyethylene terephthalate | 256 | 0.7 |
| PET-2 | Polyethylene terephthalate | 255 | 0.6 |
| PET-3 | Polybutylene terephthalate | 225 | 0.6 |

TABLE 2

| | | Melt flow rate | | M.P. |
| --- | --- | --- | --- | --- |
| Symbol | Polyolefin | 190° C. | 230° C. | (°C.) |
| PO-1 | High density polyethylene | 15 | — | 132 |
| PO-2 | High density polyethylene | 25 | — | 132 |
| PO-3 | Polypropylene | — | 6.2 | 168 |
| PO-4 | Polypropylene | — | 20 | 168 |

TABLE 3

| | | Carboxyl group content | Melt flow rate | | M.P. |
| --- | --- | --- | --- | --- | --- |
| Symbol | Modified polyolefin | (wt %) | 190° C. | 230° C. | (°C.) |
| MPO-1 | Maleic anhydride-modified polyethylene | 0.03 | 22 | | 130 |
| MPO-2 | Maleic anhydride-modified polyethylene | 0.1 | 50 | | 130 |
| MPO-3 | Maleic anhydride-modified polypropylene | 0.3 | | 20 | 165 |
| MPO-4 | Maleic anhydride-modified polypropylene | 5.0 | | 9 | 165 |

TABLE 4

| | Modified polyolefin-polyamide copolymer | | |
| --- | --- | --- | --- |
| Symbol | Modified polyolefin (wt %) | Unmodified polyolefin (wt %) | Polyamide (wt %) |
| POA-1 | MPO-2 (50) | PO-2 (20) | Nylon-6 (50) |
| POA-2 | MPO-3 (30) | — | Nylon-6 (70) |
| POA-3 | MPO-4 (10) | — | Nylon-66 (90) |

TABLE 5

| | Hot-melt-adhesive composite fiber | | | | | | | non-woven fabric | | | | |
| --- | --- | --- | --- | --- | --- | --- | --- | --- | --- | --- | --- | --- |
| | Fiber-forming component | | Adhesive component | | | | | | | | | |
| | Main component | Copolymer (wt %) | Polyolefin | Modified polyolefin (wt %) | Composite type | Fineness d/f | Spinnability | Heat treat. temp. °C. | Percent. area shrinkage % | Tenacity Kg/5 cm | Appearance | Restoring properties | Abrasion resistance |
| Ex. 1 | PET-1 | POA-1(1.0) | PO-2 | MPO-2(10.0) | Sheath-core | 3 | good | 140 | 0 | 20 | A | A | A |
| | | | | | | | | 200 | 0 | 20 | A | A | A |
| Ex. 2 | PET-2 | POA-2(5.0) | PO-1 | MPO-1(20.0) | Sheath-core | 3 | " | 140 | 0 | 28 | A | A | A |
| | | | | | | | | 200 | 0 | 28 | A | A | A |
| Ex. 3 | PET-3 | POA-2(10.0) | PO-1 | MPO-2(50.0) | Sheath-core | 3 | " | 140 | 0 | 29 | A | A | A |
| | | | | | | | | 180 | 0 | 29 | A | A | A |
| Ex. 4 | PET-1 | POA-3(25.0) | PO-2 | MPO-4(5.0) | Sheath-core | 3 | " | 140 | 0 | 20 | A | A | A |
| | | | | | | | | 200 | 0 | 22 | A | A | A |
| Ex. 5 | PET-2 | POA-3(20.0) | PO-4 | — (—) | Sheath-core | 2 | " | 180 | 0 | 23 | A | A | A |
| | | | | | | | | 200 | 0 | 23 | A | A | B |
| Ex. 6 | PET-2 | POA-2(0.6) | — | MPO-3(100.0) | Sheath-core | 3 | " | 180 | 0 | 30 | A | A | A |
| | | | | | | | | 200 | 0 | 30 | A | A | A |
| Ex. 7 | PET-1 | POA-3(15.0) | PO-1 | MPO-1(70.0) | Sheath-core | 6 | " | 140 | 0 | 28 | A | A | A |
| | | | | | | | | 200 | 0 | 28 | A | A | A |
| Ex. 8 | PET-2 | POA-2(5.0) | PO-1 | MPO-1(20.0) | Side-side | 3 | " | 140 | 0 | 25 | A | A | A |
| | | | | | | | | 200 | 0 | 25 | A | A | B |

TABLE 5-continued

| | Hot-melt-adhesive composite fiber | | | | | | | non-woven fabric | | | | | |
|---|---|---|---|---|---|---|---|---|---|---|---|---|---|
| | Fiber-forming component | | Adhesive component | | | | | | | | | | |
| | Main component | Copolymer (wt %) | Poly-olefin | Modified polyolefin (wt %) | Composite type | Fineness d/f | Spinn-ability | Heat treat. temp. °C. | Percent. area shrinkage % | Tenacity Kg/5 cm | Appearance | Restoring properties | Abrasion resistance |
| Comp. ex. 1 | PO-3 | — (—) | PO-1 | — (—) | Sheath-core | 3 | " | 140 | 0 | 20 | A | B | A |
| | | | | | | | | 160 | 50 | — | C | — | — |
| Comp. ex. 2 | PO-3 | — (—) | PO-2 | — (—) | Side-side | 3 | " | 140 | 5 | 9 | A | A | A |
| | | | | | | | | 160 | 50 | — | C | — | — |
| Comp. ex. 3 | PET-2 | POA-2(32.0) | PO-1 | MPO-1(20.0) | Sheath-Core | 3 | bad | — | — | — | — | — | — |
| Comp. ex. 4 | PET-2 | POA-2(0.4) | PO-1 | MPO-1(20.0) | Sheath-Core | 3 | good | 140 | 2.5 | 10 | B | C | C |
| | | | | | | | | 200 | 3.0 | 10 | C | C | C |
| Comp. ex. 5 | PET-2 | — (—) | PO-1 | — (—) | Sheath-Core | 3 | " | 140 | 3.0 | 10 | C | C | C |
| | | | | | | | | 200 | 4.0 | 10 | C | C | C |

What we claimed is:

1. A hot-melt-adhesive composite fiber comprising a fiber-forming component and an adhesive component, said fiber-forming component comprising 0.5 to 30% by weight of a copolymer of a carboxyl group-containing modified polyolefin with a polyamide and 70 to 99.5% by weight of a polyester, the proportion of said carboxyl group-containing modified polyolefin in said copolymer is in the range of 0.5 to 60% by weight, and said adhesive component comprising a carboxyl group-containing modified polyolefin, an unmodified polyolefin or a mixture thereof.

2. A hot-melt-adhesive composite fiber according to claim 1 wherein said carboxyl group-containing modified polyolefin is at least one of maleic anhydride modified polyethylene and maleic anhydride modified polypropylene.

3. A hot-melt-adhesive composite fiber according to claim 1 wherein said polyamide is at least one of nylon 6 and/or nylon 66.

4. A hot-melt-adhesive composite fiber according to claim 1 wherein said unmodified polyolefin is at least one of polyethylene and polypropylene.

5. A hot-melt-adhesive composite fiber according to claim 1 wherein the proportion of said carboxyl group-containing modified polyolefin in said copolymer of a carboxyl group-containing modified polyolefin with a polyamide is in the range of 2 to 50% by weight.

6. A hot-melt-adhesive composite fiber according to claim 1 wherein said adhesive component is polyethylene.

7. A hot-melt-adhesive composite fiber according to claim 1 wherein said adhesive component is polypropylene.

8. A hot-melt-adhesive composite fiber according to claim 1 wherein said fiber-forming component and said adhesive component of said hot-melt-adhesive composite fiber are arranged in the form of side by side type.

9. A hot-melt-adhesive composite fiber according to claim 1 wherein said fiber-forming component and said adhesive component of said hot-melt-adhesive composite fiber are arranged in the form of sheath and core type, said fiber-forming component forming a core component and said adhesive component forming a sheath component.

10. A hot-melt-adhesive composite fiber according to claim 2 wherein said fiber-forming component comprises said carboxyl group-containing modified polyolefin.

11. A hot-melt-adhesive composite fiber according to claim 2 wherein said adhesive component comprises said carboxyl group-containing modified polyolefin.

12. A hot-melt-adhesive composite fiber according to claim 2 wherein said fiber-forming component and said adhesive component both comprise said carboxyl group-containing modified polyolefin.

13. A hot-melt-adhesive composite fiber according to claim 1 wherein said adhesive component comprises a mixture of modified and unmodified polyolefin.

* * * * *